June 26, 1956
F. H. ETZELT
2,751,686
BORE WEAR INDICATOR
Filed April 7, 1955
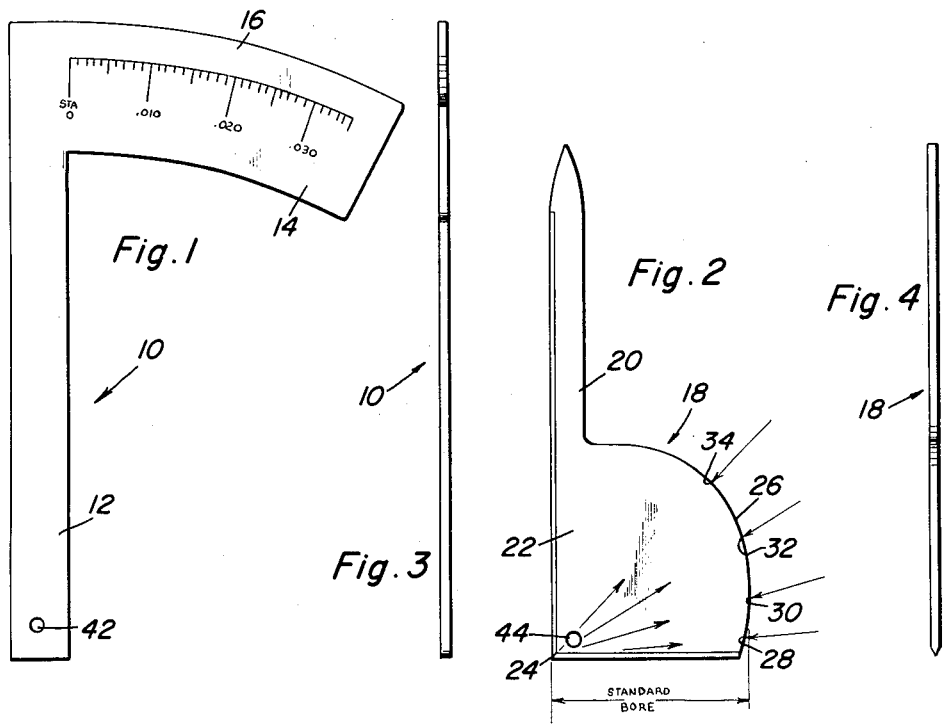
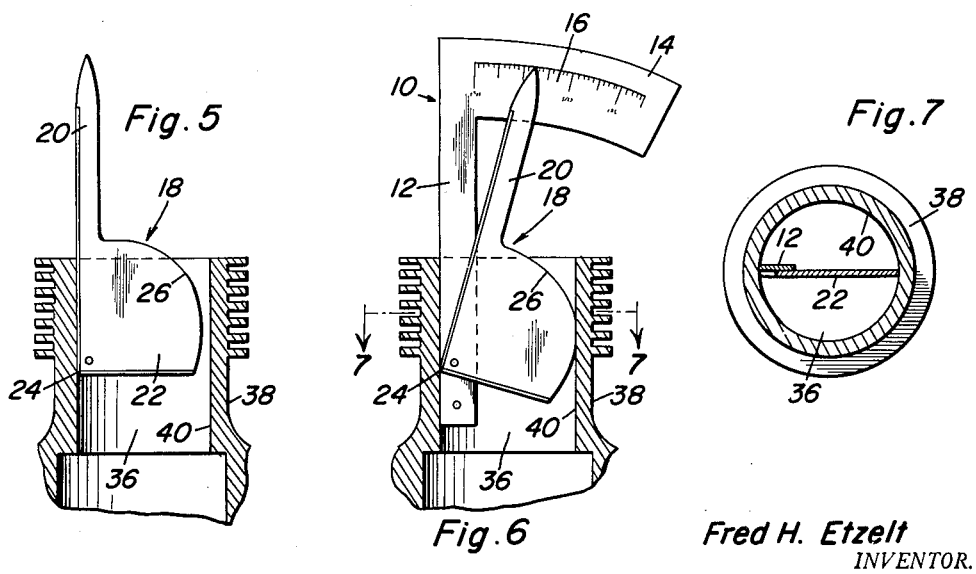
Fred H. Etzelt
INVENTOR.

United States Patent Office 2,751,686
Patented June 26, 1956

2,751,686

BORE WEAR INDICATOR

Fred H. Etzelt, Delray Beach, Fla.

Application April 7, 1955, Serial No. 499,883

3 Claims. (Cl. 33—147)

This invention relates in general to new and useful improvements in measuring instruments, and more specifically to an improved more wear indicator.

In order for one to measure the wear of a bore, particularly a bore such as a cylinder bore of an internal combustion engine, it is necessary for the machinist or mechanic to measure with a micrometer the diameter of the bore. It is then necessary to subtract from this reading the standard diameter of the bore. The resultant reading then gives the machinist or mechanic the amount of wear. Not only does this method require the use of an expensive micrometer, but also leaves open the possibility of error during the subtraction process.

It is therefore the primary object of this invention to provide an improved bore wear indicator which when applied to the bore for which it is specifically intended, will give a direct reading as to the amount of wear in the confining walls of such bore.

Another object of this invention is to provide an improved bore wear indicator which is formed in two separate parts, the bore wear indicator including a gauge member and a dial member, the gauge member having a pointer adapted to be associated with the dial of the dial member and including remote surfaces of increasing distances to accommodate for variance in the diameter of the bore, the wear of the confining walls of the bore being readable through the use of the pointer and the dial.

A further object of this invention is to provide an improved bore wear indicator, the bore wear indicator including a gauge member having a point adapted to position with respect to the confining wall of a bore and having disposed remote therefrom a gauge surface, the gauge surface varying in distance from the point and being engageable with the confining wall of the bore remote from the point to indicate the amount of wear in the confining walls and the oversize of the bore.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the dial member of the bore wear indicator and shows the general details thereof;

Figure 2 is an elevational view of the gauge of the bore wear indicator and shows the general details thereof;

Figures 3 and 4 are end elevational views of the dial member and the gauge, respectively;

Figure 5 is a fragmentary sectional view through a cylinder taken on a small scale and shows the gauge initially positioned therein for the purpose of determining the oversize of the bore;

Figure 6 is a view similar to Figure 5 and shows the dial member positioned within the bore and the gauge swung to a bore measuring position and associated with the dial member for indicating the amount of oversize of the bore; and Figure 7 is a transverse horizontal sectional view on a reduced scale taken substantially upon the plane indicated by the section line 7—7 of Figure 6 and shows the relationship of the dial member and the gauge when positioned within the bore.

Referring now to the drawings in detail, it will be seen that there is illustrated in Figures 1 and 3 a dial member which is referred to in general by reference numeral 10. The dial member 10 includes an elongated depending leg 12 which has formed integral with the upper end thereof an arcuate arm 14. The arm 14 is in the form of a dial and has formed thereon suitable indicia 16 indicating the oversize of a bore to be measured.

Referring now to Figures 2 and 4 in particular, it will be seen that there is illustrated a gauge which is referred to in general by the reference numeral 18. The gauge 18 includes an upstanding pointer 20 which has connected integrally to the lower part thereof a body member 22. The body member 22 includes a pointed corner 24 and a gauge surface 26 remote from the corner 24. The portions of the gauge surface 26 are so spaced from the corner 24 so as to permit the measuring of a specific bore and the ability to determine the amount of oversize of such bore. The gauge surface 26 includes a point 28 which is spaced from the corner 24 a distance equal to the standard diameter of a bore to be measured. The gauge surface also includes points 30, 32 and 34 which may correspond in distance from corner 24 to .010, .020, and .030 oversize, respectively, of the bore.

In the use of the bore wear indicator, which is the subject of this invention, the gauge 18 is disposed within a bore 36, such as the bore of the cylinder 38, as is best illustrated in Figure 5. Then, the leg 12 of the dial member 10 is positioned within the bore 36 alongside the gauge member 18 and with the edge of the leg 12 remote from the arm 14 disposed in engagement with the confining wall 40 of the bore 36. The dial member 10 is lowered into the bore 36 until such time as the upper end of the pointer 20 is aligned with the dial 16, as is best illustrated in Figure 6. The gauge 18 is then permitted to pivot about the engagement of the corner 24 with the confining wall 40 until the gauge surface 26 engages the confining wall 40 at a diametrically opposite point from the engagement of the corner 24 with the confining wall. Inasmuch as the angular relationship between the pointer 20 and the arm 14 is the same as the angular relationship between the corner 24 and corresponding points of the gauge surface 26, the pointer 20 will indicate directly on the dial 16 the amount of wear of the bore 36. It is to be understood that in order to obtain a correct reading, the pointer 20 must be related with respect to the dial 16, as illustrated in Figure 6.

The corner 24, as described above, is in the form of a point. The point is sharpened in order that it may be positioned in pits or wear spots in the confining wall 40. In this manner, the depth of the pits may be taken into consideration when measuring the bore 36.

In order that the dial member 16 and the gauge 18 may be conveniently hung in one's workshop, the lower end of the leg 12 is provided with a bore 42 and the body member 22 is formed with a bore 44. Inasmuch as both the dial member 10 and the gauge 18 are formed of flat sheet metal, it will be readily apparent that they may be conveniently hung up on a wall.

It is pointed out at this time that while it will be necessary for a machinist or mechanic to have a bore wear indicator for each bore to be measured, in many instances a mechanic, especially when working for a particular type of automotive dealer, will work on a limited number of engines, thus limiting the number of bore wear indicators required. Further, because of the details of construction of the bore wear indicator, it may be formed of relatively inexpensive material and mass produced so that the cost of a plurality of such bore wear indicators will be no greater than the cost of a good micrometer set, such as is necessary to measure bores of different diameters.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A bore wear indicator comprising a gauge adapted to be positioned in a bore, and a dial member, said gauge comprising a pointer adapted to project up out of a bore, a body member connected to a lower end of said pointer, said body member including a corner adapted to engage a surface of a confining wall of a bore, a gauge surface on said body member remote from said corner, said gauge surface increasing in distance from said corner, said dial member including a leg adapted to depend in a bore along said pointer and a dial at the upper end of said leg and projecting to one side thereof.

2. A bore wear indicator comprising a gauge adapted to be positioned in a bore, and a dial member, said gauge comprising a pointer adapted to project up out of a bore, a body member connected to a lower end of said pointer, said body member including a corner adapted to engage a surface of a confining wall of a bore, a gauge surface on said body member remote from said corner, said gauge surface increasing in distance from said corner, said dial member including a leg adapted to depend in a bore along said pointer and a dial at the upper end of said leg and projecting to one side thereof, said corner being in the form of a sharpened point adapted to be positioned in pits and the like in the confining wall to measure the depth of the pits.

3. A bore wear indicator comprising a gauge adapted to be positioned in a bore, and a dial member, said gauge comprising a pointer adapted to project up out of a bore, a body member connected to a lower end of said pointer, said body member including a corner adapted to engage a surface of a confining wall of a bore, a gauge surface on said body member remote from said corner, said gauge surface increasing in distance from said corner, said dial member including a leg adapted to depend in a bore along said pointer and a dial at the upper end of said leg and projecting to one side thereof, said gauge surface having a portion thereof spaced from said corner a distance equal to the diameter of a bore considered standard for said gauge, said pointer being aligned with a zero marking on said dial when said gauge and said dial member are disposed in a standard bore.

References Cited in the file of this patent

UNITED STATES PATENTS

| | | |
|---|---|---|
| 1,979,912 | Stirling | Nov. 6, 1934 |
| 2,546,154 | Gardner | Mar. 27, 1951 |
| 2,664,642 | Rae | Jan. 5, 1954 |

FOREIGN PATENTS

| | | |
|---|---|---|
| 514,192 | France | Nov. 13, 1920 |
| 74,415 | Sweden | May 31, 1932 |
| 645,024 | Germany | May 20, 1937 |